United States Patent
Nishimura (10) Patent No.: US 7,006,083 B2
(45) Date of Patent: Feb. 28, 2006

(54) IMAGE DISPLAY APPARATUS AND IMAGE DISPLAY METHOD

(75) Inventor: Naoki Nishimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 10/602,161

(22) Filed: Jun. 24, 2003

(65) Prior Publication Data
US 2004/0001058 A1    Jan. 1, 2004

(30) Foreign Application Priority Data
Jun. 28, 2002    (JP)    ............................. 2002-190552
Jun. 13, 2003    (JP)    ............................. 2003-169724

(51) Int. Cl.
G09G 5/00    (2006.01)

(52) U.S. Cl. ............................. 345/211; 345/2.3; 345/85

(58) Field of Classification Search .................. 345/84, 345/85, 87, 108, 109, 111, 211, 214, 1.2, 345/2.3
See application file for complete search history.

(56) References Cited

U.S. PATENT DOCUMENTS

| | | | | |
|---|---|---|---|---|
| 5,153,573 A | * | 10/1992 | Spletter | 345/84 |
| 5,345,131 A | * | 9/1994 | Torok | 310/181 |
| 5,548,282 A | * | 8/1996 | Escritt et al. | 340/5.91 |
| 6,825,829 B1 | * | 11/2004 | Albert et al. | 345/107 |
| 6,924,781 B1 | * | 8/2005 | Gelbman | 345/85 |

* cited by examiner

Primary Examiner—Xiao Wu
(74) Attorney, Agent, or Firm—Cowan, Liebowitz & Latman, P.C.

(57) ABSTRACT

The invention realizes an image display by wireless communication. There is provided an image display apparatus constituted by an image display unit including an arrangement of plural wireless image forming elements, and a wireless transmission unit. The wireless transmission unit is provided with a wireless transmission circuit, while the wireless image forming element is provided with an image forming element, a wireless element.

6 Claims, 9 Drawing Sheets

IMAGE DISPLAY APPARATUS AND IMAGE DISPLAY METHOD

BACKGROUND OF THE INVENTION

1. Field of the Invention

The present invention relates to an image display apparatus and an image display method for forming an image with an image forming element.

2. Related Background Art

In recent years, a large-sized flat panel display represented by a plasma display and a liquid crystal display for mobile equipment are widely utilized in various situations.

These displays are different in following points from the display of so-called cathode ray tube type in which an electron beam irradiates a phosphorescent material in different positions on an image frame and is put into a scanning motion to display an entire image.

Figure 18:
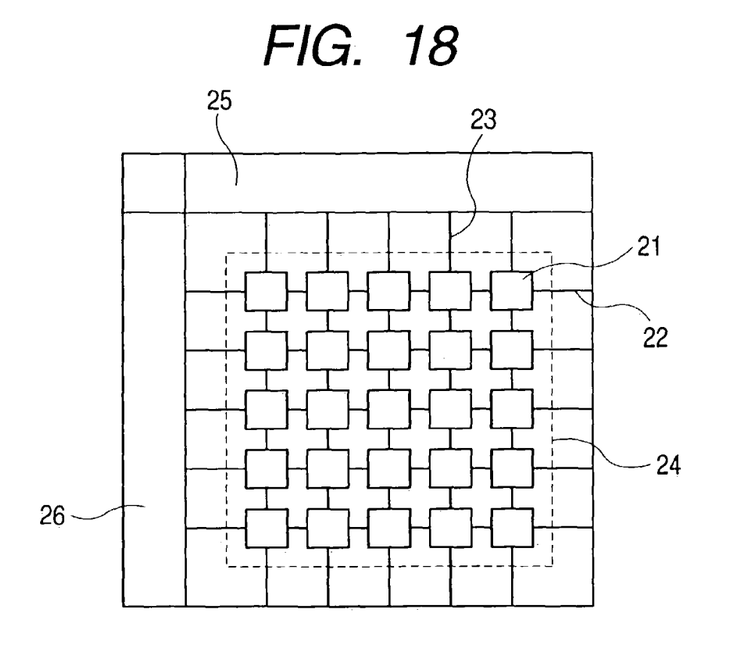
FIG. 18 is a view showing a circuit configuration of a conventional image display apparatus.

In a plasma display or a liquid crystal display, a plurality of image forming elements 21 are arranged in a matrix arrangement as shown in FIG. 18, and a signal is supplied to each element from a drive circuit constituted by a column circuit 25 and a row circuit 26, through wirings 22, 23, thereby independently performing a display on each element and thus forming an entire image.

For example, in a liquid crystal display of an active matrix drive type, an image forming element 21 as shown in FIG. 18 receives a row selecting signal and an image signal respectively from a scanning circuit 26 constituting a row circuit and a hold circuit 25 receiving an image signal from the exterior, through the wirings 22, 23, thereby performing a display and thus forming an entire image. Consequently, electric wirings for connecting at least two drive circuits and individual image forming elements are formed in a matrix pattern.

As explained above, the flat panel display and the display for mobile equipment are expected to hereafter become larger and finer in definition. Therefore, the wirings 22, 23 to each pixel are becoming longer. Also a number of pixels formed on an image area tends to become larger. At the same time, for achieving a higher image quality, it will be required to display images transmitted at an ever increasing transfer rate.

Also, as a display device for mobile equipment, a paper-like display which is thin and bendable like paper is recently attracting attention. Such display is required to have a structure capable of withstanding deformation such as bending.

Also a display apparatus for image display by wireless communication is described, for example, in Japanese Patent Application Laid-open No. 2000-112425 and Japanese Patent Application Laid-open No. 9-127913.

SUMMARY OF THE INVENTION

The present invention provides a novel image display apparatus and a novel image display method. In a first technical aspect of the present invention, the novel image display apparatus comprises: an image display unit in which a plurality of wireless image forming elements are arranged, each of the plurality of wireless image forming elements having an image forming element and a wireless element, the wireless element being adapted to execute a reception of an instruction for image formation by a wireless communication and a reception of a drive energy for the image forming element by a wireless communication; and a wireless transmission unit for executing a transmission of the instruction for image formation and a transmission of the drive energy by means of wireless communications.

In a second aspect of the present invention, the wireless elements of the plurality wireless image forming elements as provided in the first aspect are adapted to selectively receive electromagnetic waves of respective different frequencies.

In a third aspect of the present invention, the novel image display apparatus: an image display unit in which a plurality of wireless image forming elements are arranged, each of the plurality of wireless image forming elements having an image forming element and a wireless element, the wireless element being adapted to execute a reception of an instruction for image formation by a wireless communication and/or a reception of a drive energy for the image forming element by a wireless communication; and a plurality of wireless transmission units for executing a transmission of the instruction for image formation and/or a transmission of the drive energy by means of wireless communications; wherein the plural wireless transmission units are adapted to execute the transmission of the instruction for image formation and/or the transmission of the drive energy by wireless communication to the respective different wireless elements.

In a fourth aspect of the present invention, the novel image display apparatus comprises: an image display unit in which a plurality of wireless image forming elements are arranged, each of the plurality of wireless image forming elements having an image forming element and a wireless element, the wireless element being adapted to execute a reception of an instruction for image formation by a wireless communication and/or a reception of a drive energy for the image forming element by a wireless communication; and a wireless transmission unit for executing a transmission of the instruction for image formation and/or a transmission of the drive energy by means of wireless communications; wherein the wireless transmission unit is provided on a rear face side of the image display unit.

In a fifth aspect of the present invention, the novel image display apparatus comprises: an image display unit in which a plurality of wireless image forming elements are arranged, each of the plurality of wireless image forming elements having an image forming element and a wireless element, the wireless element being adapted to execute a reception of an instruction for image formation by a wireless communication and/or a reception of a drive energy for the image forming element by a wireless communication; a wireless transmission unit for executing a transmission of the instruction for image formation and/or a transmission of the drive energy by means of wireless communications; and a container for containing the image display unit and the wireless transmission unit; wherein the container is adapted to shield a leakage, to the exterior, of the instruction for image formation and/or the drive energy, transmitted from the wireless transmission unit.

In a sixth aspect of the present invention, the novel image display method is used in an image display apparatus which comprises: an image display unit consisting of an arrangement of a plurality of wireless image forming elements, each having an image forming element and a wireless element for executing a reception of an instruction for image formation by a wireless communication and/or a reception of a drive energy for the image forming element by a wireless communication; and a wireless transmission unit for executing a transmission of the instruction for image formation and/or a transmission of the drive energy by means of wireless communications, and this image display method comprises the steps of: shortening a distance between the wireless element and the wireless transmission unit; and executing the reception in the state with the distance being shortened.

In a seventh aspect of the present invention, the step of shortening as provided in the sixth aspect is performed by deforming at least one portion of the image display apparatus.

In an eighth aspect of the present invention, the step of shortening the distance as provided in the seventh aspect is performed by deforming the image display unit.

In a ninth aspect of the present invention, the novel image display method is used in an image display apparatus which comprises: an image display unit consisting of an arrangement of a plurality of wireless image forming elements, each having an image forming element and a wireless element for executing a reception of an instruction for image formation by a wireless communication and/or a reception of a drive energy for the image forming element by a wireless communication; a wireless transmission unit for executing a transmission of the instruction for image formation and/or a transmission of the drive energy by means of wireless communication; and a container for containing the wireless transmission unit, and this image display method comprises the steps of: containing the image display unit in the container; and executing the transmission in a state in which the image display unit is contained in the container.

In a tenth aspect of the present invention, the novel image display method is used in an image display apparatus which comprises: an image display unit consisting of an arrangement of a plurality of wireless image forming elements, each having an image forming element and a wireless element for executing a reception of an instruction for image formation by a wireless communication and/or a reception of a drive energy for the image forming element by a wireless communication; a wireless transmission unit for executing a transmission of the instruction for image formation and/or a transmission of the drive energy by wireless communication; and a container for containing the image display unit and the wireless transmission unit, and this image display method comprises the steps of: rendering shieldable by the container a leakage, to the exterior, of the instruction for image formation and/or the drive energy, transmitted from the wireless transmission unit; and executing the transmission in the shieldable state.

In an eleventh aspect of the present invention, the novel image display method is used in an image display apparatus which comprises: an image display unit consisting of an arrangement of a plurality of wireless image forming elements, each having an image forming element and a wireless element for executing a reception of an instruction for image formation by a wireless communication and/or a reception of a drive energy for the image forming element by a wireless communication; and a wireless transmission unit for executing a transmission of the instruction for image formation and/or a transmission of the drive energy by wireless communication, and this image display method comprises the steps of: changing a relative position of the wireless transmission unit and the image display unit; and executing the transmission while changing of the relative position.

In a twelfth aspect of the present invention, the novel image display apparatus comprises: an image display unit in which a plurality of wireless image forming elements are arranged, each of the plurality of wireless image forming elements having an image forming element and a wireless element, the wireless element being adapted to execute a reception of an instruction for image formation by a wireless communication and a reception of a drive energy for the image forming element by a wireless communication; wherein the image display unit performs image display by receiving the instruction for image formation and the drive energy which are being transmitted by the wireless communication.

In a thirteenth aspect of the present invention, the novel transmitter comprises: a wireless transmission unit for executing a transmission of an instruction for image formation and a drive energy by means of wireless communications, wherein the wireless transmission unit is adapted to execute the transmission to an image display unit in which a plurality of wireless image forming elements are arranged, each of the plurality of wireless image forming elements having an image forming element and a wireless element, the wireless element being adapted to execute a reception of an instruction for image formation by a wireless communication and a reception of a drive energy for the image forming element by a wireless communication.

In a fourteenth aspect of the present invention, the novel image display apparatus comprises: an image display unit in which a plurality of wireless image forming elements are arranged, each of the plurality of wireless image forming elements having an image forming element and a wireless element, the wireless element being adapted to execute a reception of an instruction for image formation by a wireless communication and/or a reception of a drive energy for the image forming element by a wireless communication, wherein the image display unit performs image display by receiving the instruction for image formation and/or the drive energy which are being transmitted from a plurality of transmission units by means of wireless communications and wherein the plurality of wireless image forming elements comprise wireless image forming elements for receiving the instruction for image formation and/or the transmission of the drive energy which are being transmitted from respective different transmission elements.

In a fifteenth aspect of the present invention, the novel transmitter comprises: a plurality of wireless transmission units, each of the wireless transmission units executing a transmission of an instruction for image formation and/or a transmission of an energy by means of wireless communications, wherein the transmitter is adapted to execute the transmission to an image display unit in which a plurality of wireless image forming elements are arranged, each of the plurality of wireless image forming elements having an image forming element and a wireless element, the wireless element being adapted to execute a reception of an instruction for image formation by a wireless communication and/or a reception of a drive energy for the image forming element by a wireless communication, and wherein the wireless transmission units are adapted to execute the transmissions to respective different wireless elements.

Each of the technical aspects as stated above can be properly combined with any of the other aspects. For example, it is possible to combine the image display unit and wireless transmission units as provided in the first or second aspect with the apparatus or method in any-of the other aspects.

DESCRIPTION OF THE PREFERRED EMBODIMENTS

The present inventors have found that major difficulties have existed in utilizing a wireless communication in an image display apparatus.

One of such difficulties is a supply of an electric power. In case an image signal is transmitted by a wireless communication, there is required an electric power for controlling a display device in a desired state, in order to perform a display based on such image signal. When a wiring is employed for supplying such electric power, it becomes necessary to consider an influence of a voltage drop resulting on the wiring, and it is not possible to improve the poor resistance of the display apparatus against a deformation such as a bending.

Also in combination with the above-mentioned difficulty or independently therefrom, there arises a difficulty that a strong transmission output is required for executing an image display by a wireless communication.

For example, with an increase in the size of the display, wirings between the image forming element and the drive circuit become longer, thereby resulting in a delay in electrical signals and lowering a display speed. There also result a drawback in the manufacture such as a higher probability of breakage of wiring, and a lowered production yield resulting from a complication of the process.

Also in a display of so-called simple matrix type, not having a switching element in each image forming element, a drive of an image forming element may induce a crosstalk by a leakage of the signal to other elements, thereby inhibiting a proper display operation.

Such difficulties also arise toward a higher definition. For example, in a higher definition, the width of the wiring becomes smaller to decrease a cross sectional area of the wiring, thereby increasing a resistance of the wiring and generating a delay in the signal.

Also in a paper-like display, if a metal wiring is employed, the display becomes difficult to bend since such wiring may be deformed and may be broken.

Also since a number of the image forming elements constituting a single display increases, displays containing a defective element somewhere in the image area also increase, thereby elevating the rate of such defective products.

In the following there will be explained a configuration capable of eliminating or reducing the wirings. Also there will be explained, in detail, an image display apparatus and an image display method suitable for providing a display by wireless communication.

In the following there will be explained, with reference to accompanying drawings, an image display apparatus constituting a representative embodiment of the present invention.

(Embodiment 1)

Figure 1:
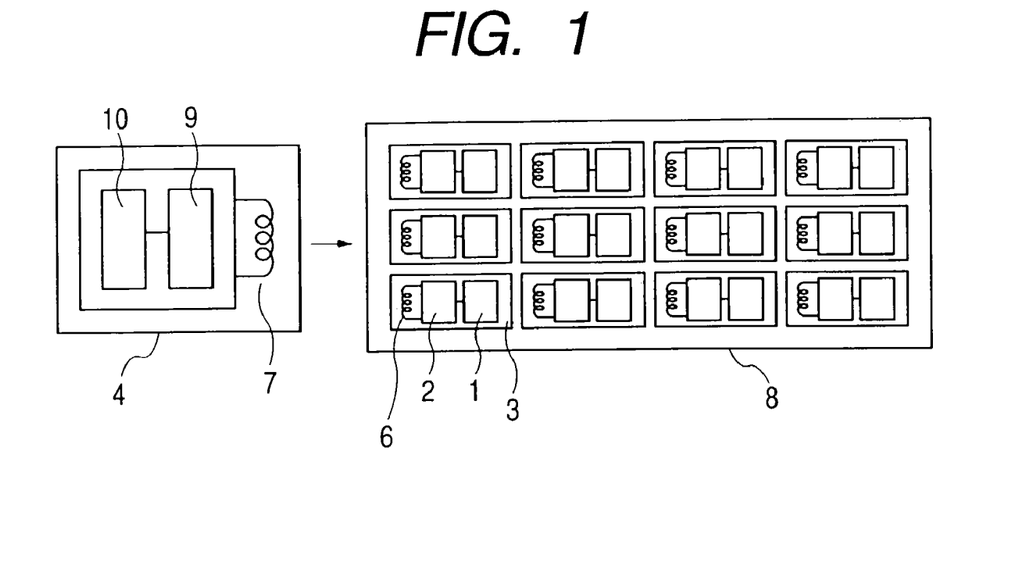
FIG. 1 is a view showing a circuit configuration of an image display apparatus of the present invention.

FIG. 1 is a schematic view showing the configuration of an embodiment 1 of the image display apparatus.

The image display apparatus of the present embodiment is constituted by an image display unit 8 having a plurality of wireless image forming elements 3, and a wireless transmission unit 4 positioned in a vicinity thereof. The image display unit 8 shown in FIG. 1 shows a case of a 3×4 array of the wireless image forming elements 3, but the number of the wireless image forming elements need only be plural and is not limited to the example shown in FIG. 1. Each wireless image forming element constitutes a pixel, and an image is displayed by a group of such pixels.

The wireless transmission unit 4 is provided with an image data signal circuit 10, a wireless transmission circuit 9 connected thereto, and an antenna. The image data signal circuit 10 receives information for image display from an unrepresented external personal computer or a tuner, and, after converting such information into a format matching a display system of the image display unit 8, sends it to the wireless transmission circuit 9. The wireless transmission circuit 9 executes wireless transmission of such information through the antenna 7 to the image display unit 8. The information thus transmitted designates a position of the element where the display is to be made in the image display unit 8.

The wireless image forming element 3 is provided with an image forming element 1, a wireless element 2 and an antenna 6. The information transmitted from the antenna 7 of the wireless transmission unit is received, through the antenna 6, by the wireless element 2. This information is transferred to the image forming element 1. The image forming element, having received information for turning on the display, forms an image whereby an image is displayed over the entire image display unit. The wireless element 2 has a first function of receiving an instruction for image formation from the wireless transmission unit 4 by a wireless communication and giving such instruction to the image forming element 3, and a second function of receiving an energy, required in the image forming element 3 for forming an image, by wireless communication and supplying the image forming element 3 with such energy. In this case, the wireless element 2 may be constituted by a first wireless element having the first function, and a second wireless element having the second function. The instruction for image formation, received by the wireless element, may have various configurations, such as a binary gradation information indicating an on/off state of the image forming element, or, in case the image forming element is capable of operations corresponding to three or more gradation levels, a multi-level information corresponding to such three or more gradations levels. Also for a modulation for the image forming element, there may be adopted various configurations such as an amplitude modulation, a pulse width modulation or a combination thereof.

Figure 2:
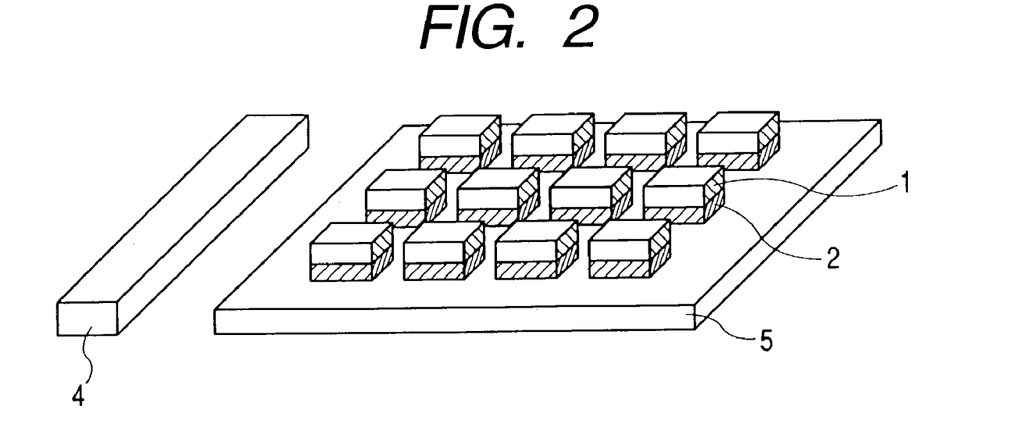
FIG. 2 is a view showing a configuration of the image display apparatus of the present invention.
Figure 3:
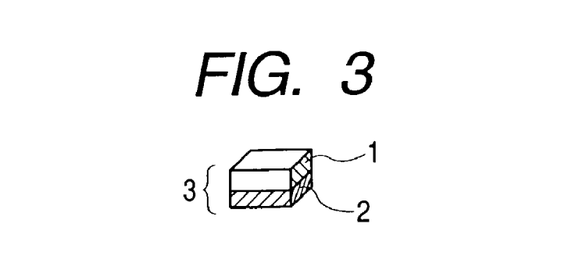
FIG. 3 is a view showing a wireless image forming element of the present invention.

FIG. 2 shows an example of the configuration of the image display apparatus of the present embodiment. A wireless image forming element 3, constituted by a wireless element 2 and an image forming element 1 in a laminated structure as shown in FIG. 3, is positioned in plural units on a substrate (base member) 5. Also a wireless transmission unit 4 is provided in a vicinity thereof.

Also a color image can be obtained by providing colors filters of red (R), green (G) and blue (B) on the image generated by the image forming elements 1.

Also the antennas of the wireless transmission unit and the wireless element may be of a coil shape as shown in FIG. 1, or a flat shape such as of a dipole antenna. Either shape is selected according to a frequency, a distance etc.

(Embodiment 2)

In the image display system of the present invention shown in FIGS. 1 and 2, an electromagnetic wave (including a varying magnetic field) emitted from the wireless transmission unit 4 is simultaneously received by plural wireless image forming elements. For the method of communication with the wireless image forming element, there can be conceived certain methods.

For example, there can be adopted a configuration in which the wireless elements have respectively different inductances or capacitances. A resonance frequency can be represented by an inductance L and a capacitance C as follows:

$$fc = 1/(2\pi(LC)^{1/2}) \quad (1)$$

Thus the display is made possible by providing the wireless elements with respectively different resonance frequencies and transmitting, to the elements desired for image display, electromagnetic waves of corresponding frequencies from the wireless transmission unit 4, whereby an arbitrary image can be formed on the entire display apparatus.

There may also be adopted a digital modulation method such as amplitude modulation, frequency modulation or phase modulation.

There may also be employed a digital modulation method such as amplitude modulation, frequency modulation or phase modulation. In such method, a carrier wave of a constant frequency is transmitted, and information is transmitted by giving a change in one of three parameters of such carrier wave, namely a power, a frequency or a phase. Energy required by the image forming element at the image formation can be transmitted by such carrier wave.

Figure 5:
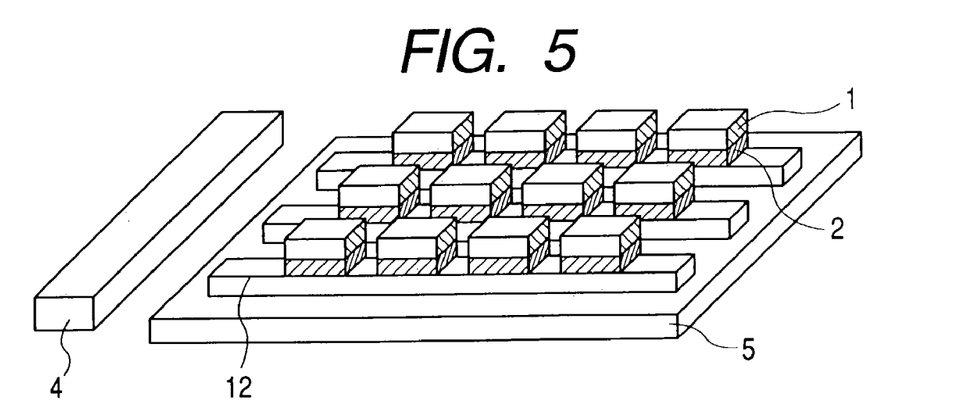
FIG. 5 is a view showing a configuration of the image display apparatus of the invention.

One of the inventions of the present application is a wireless supply of the energy for image formation (drive energy of the image forming element), and there can be thus be obtained an advantage that the wirings for supplying the energy for image formation can be dispensed with. In the aforementioned configuration, all the energy required for image formation is supplied by wireless method. However such configuration is not restrictive, and it is also possible to supply a part of the energy used for image formation by a wireless method and another part of the energy for image formation by energy supplying wirings 12 as shown in FIG. 5. Also in such configuration, by supplying a part of the drive energy of the image forming element and an instruction for image formation such as an on/off state of the image forming element in the wireless method, there can be obtained an advantage that the characteristics required for the wirings provided in the image display apparatus can be relaxed.

(Embodiment 3)

This embodiment shows a configuration suitable for wireless supply of an instruction for image formation and/or a drive energy for the image forming element. Also in the following embodiment, there can be advantageously employed a configuration supplying both the instruction for image formation and the drive energy for the image forming element by a wireless method.

Figure 6:
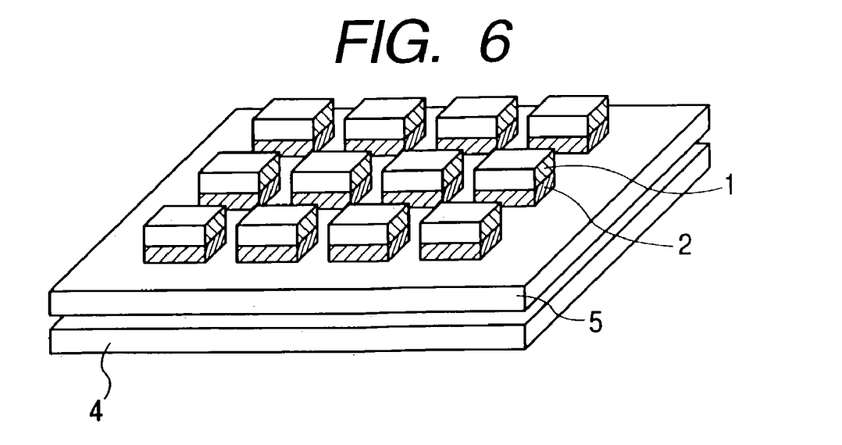
FIG. 6 is a view showing a configuration of the image display apparatus of the invention.

In this embodiment, the wireless transmission unit is provided, as shown in FIG. 6, on a rear side of the wireless image forming element (namely on the rear side of the image display unit, or a side opposite to the image display side). In this manner it is rendered possible to position the wireless transmission unit in the vicinity of the wireless element.

Figure 7:
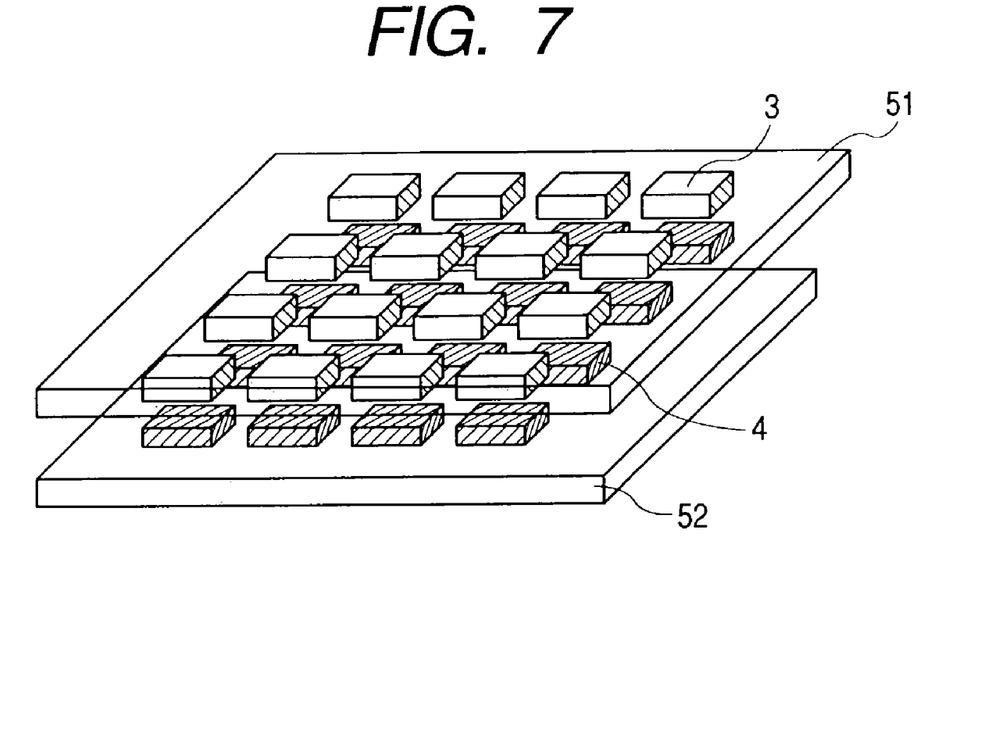
FIG. 7 is a view showing a configuration of the image display apparatus of the invention.

The wireless transmission unit is advantageously provided in plural units. By a configuration that the wireless image forming elements constituting objects of transmission of the instruction for image formation and the drive energy for the image forming element (hereinafter also called transmission object wireless image forming elements) utilize mutually different plural wireless transmission units (they may partially overlap if necessary but do not overlap completely), it is possible to improve the uniformity of a distance between the wireless transmission units and the wireless elements. For example, there can be advantageously employed, as shown in FIG. 7, a configuration in which the wireless image forming elements 3 provided on a transparent substrate 51 and the wireless transmission unit 4 provided on a substrate 52 are respectively paired. In this case, in the wireless image forming element 3, the image forming element is positioned at the side of the substrate 51. In such configuration, the distance between the wireless transmission unit and the wireless element is shortened and there is employed so-called spatial multiplex system in which the individual elements can be communicated spatially, whereby the mutual interference between the elements can be effectively suppressed.

Figure 8:
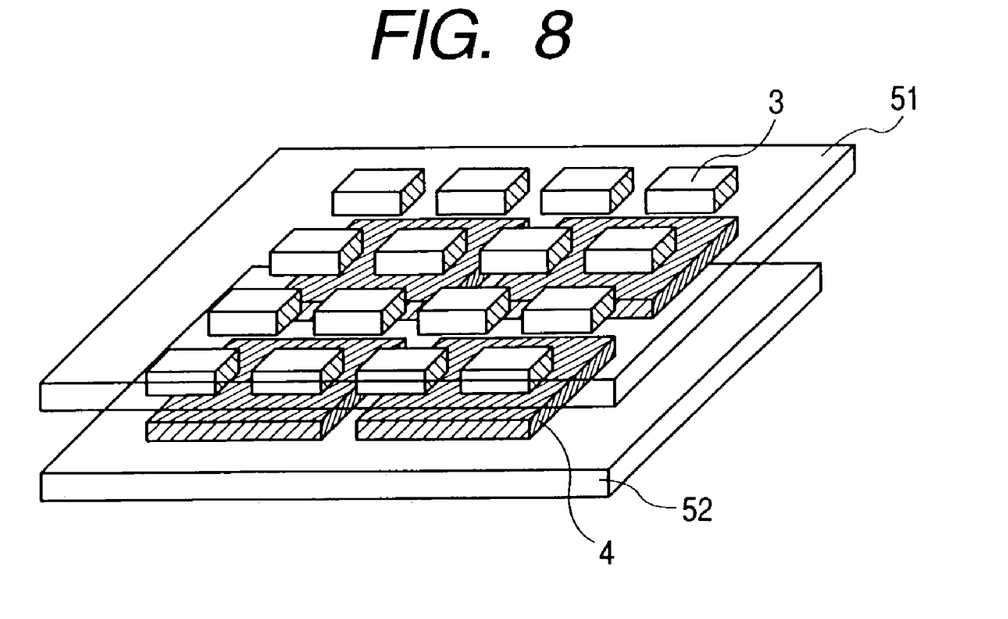
FIG. 8 is a view showing a configuration of the image display apparatus of the invention.
Figure 9:
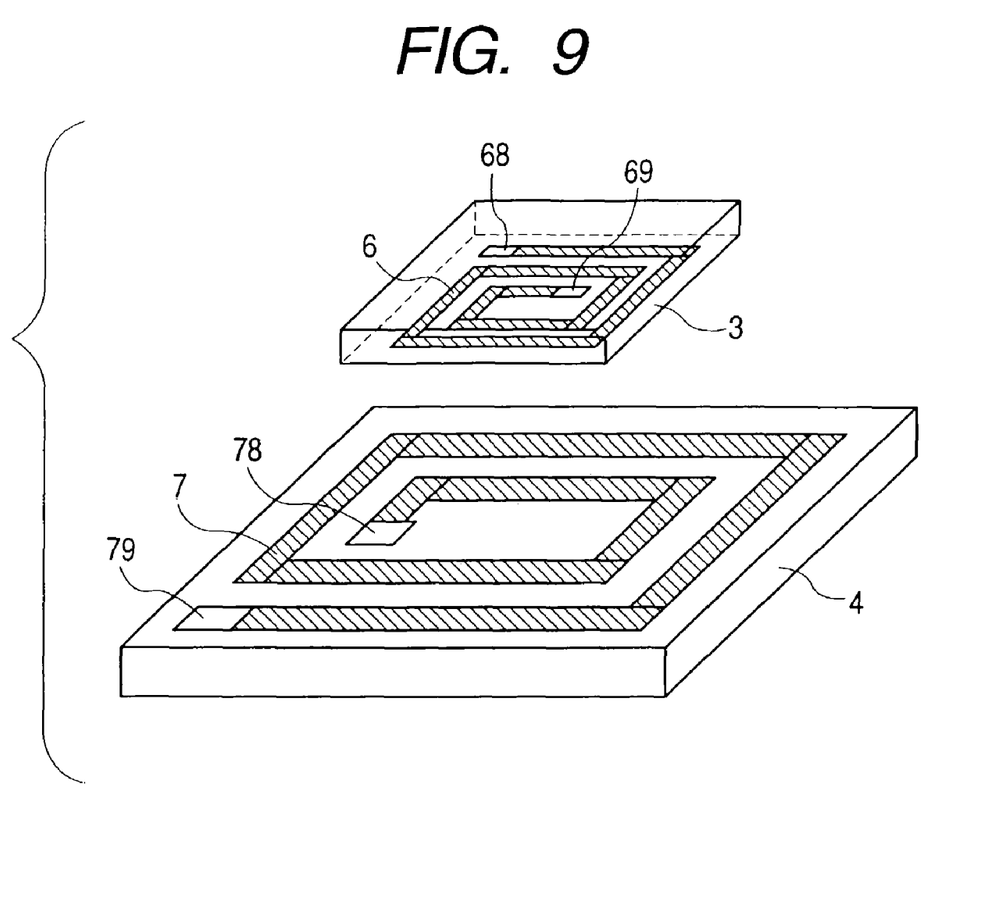
FIG. 9 is a view showing an example of the wireless image forming unit and the wireless transmission unit of the image display apparatus of the present invention.

Also, as an improvement of the configuration shown in FIG. 7, it is possible to provide a wireless transmission unit 4 corresponding to every plural, for example, four wireless image forming elements 3. Such configuration allows to further simplify the structure. FIG. 9 is a view showing the structure of an antenna in FIG. 8. An antenna 6 of the wireless image forming element 3 has a spiral form and induces a current by catching a change in the magnetic field, thereby generating a voltage between terminals 68, 69. The wireless transmission unit 4 has a similar structure, in which a high frequency current is applied between terminals 78, 79 of a spiral-shaped antenna 7, thereby giving a generated magnetic field to the wireless image forming element 3.

Figure 10:
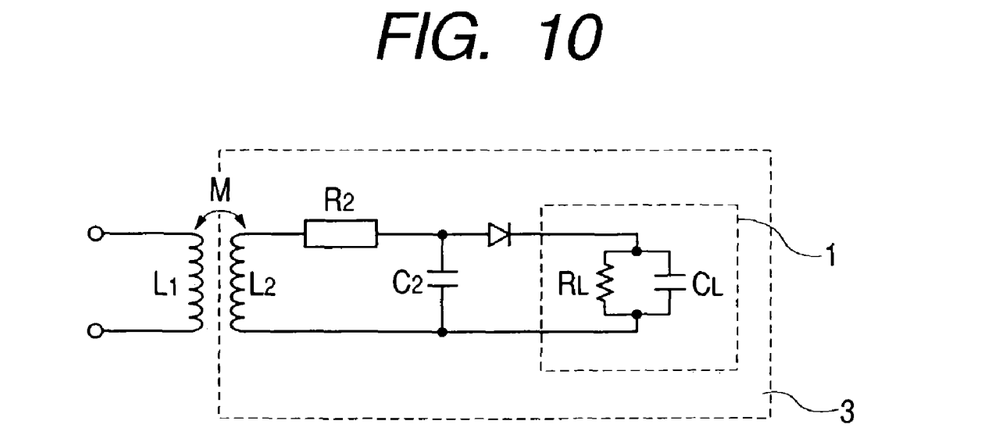
FIG. 10 is a view showing the circuit configuration of the image display apparatus of the present invention.

FIG. 10 is a circuit diagram of the structure shown in FIG. 9.

The antenna 7 of the wireless transmission unit 4 is represented by a coil of an inductance L1, while the antenna 6 of the wireless image forming element 3 is represented by a coil of an inductance L2. The coils of L1 and L2 are physically not in mutual contact, but are magnetically coupled by a mutual inductance M. R2 indicates a resistance of the coil L2. A capacitance C2 is connected parallel to L2, so as to be resonant with a frequency of an electromagnetic wave transmitted from the antenna 7. Also the image forming element 1 is connected in parallel, but a diode is inserted in the circuit to rectify an alternating current into a single polarity, thereby applying an electric field of a specified direction to the image forming element. A liquid crystal element, showing a change in the orientation under the application of an electric field, is therefore rendered capable of image formation. As an example of the image forming element 1, there is illustrated a liquid crystal element constituted by a resistance RL and a capacitance CL.

In the configuration shown in FIG. 10, an electrical field of a direction only is applied to the liquid crystal element, but by applying an electric field of both directions, for example, by providing a switch in the vicinity of the diode, there can be employed a liquid crystal device having a memory property such as a ferroelectric liquid crystal. In such case the electromagnetic field needs to be transmitted only in case of inverting the polarity.

Figure 11:
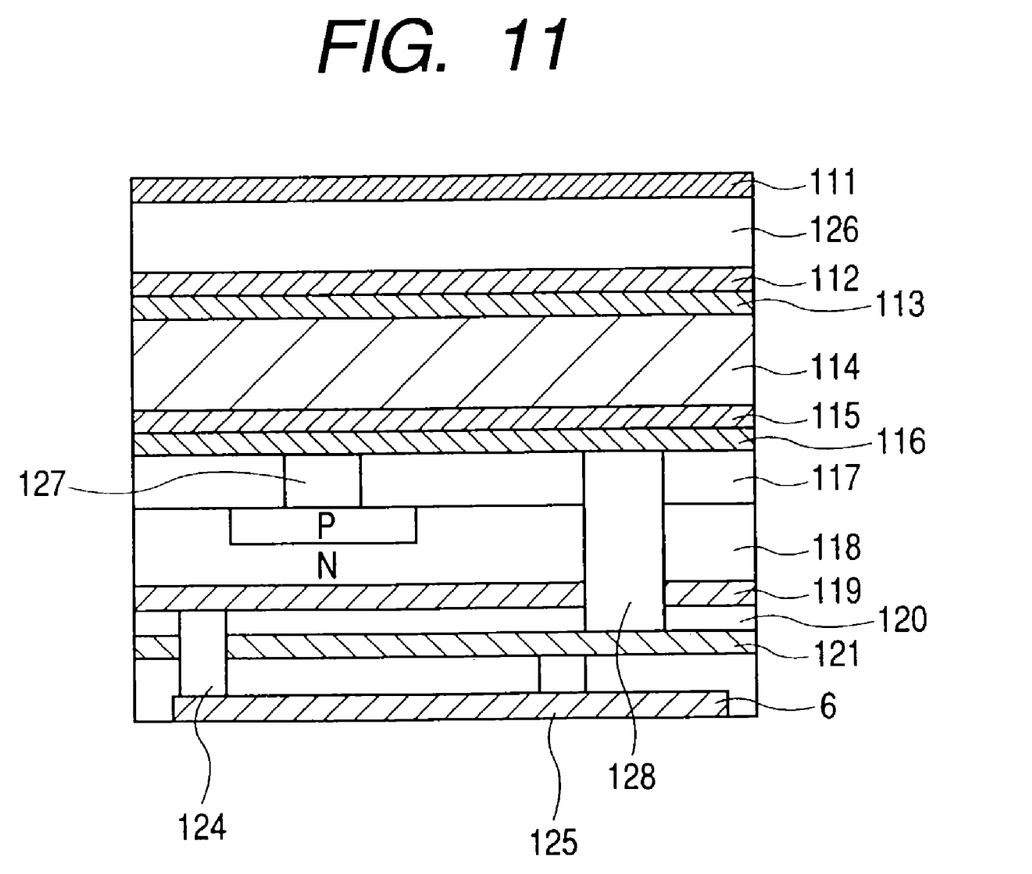
FIG. 11 is a cross-sectional view showing a wireless image forming element of the present invention.

FIG. 11 is a cross-sectional view showing an example of the configuration of the wireless image forming element 3 shown in FIGS. 9 and 10.

A via electrode 125 connected to a terminal of the antenna 6 is connected to a capacitance C2 formed by an electrode 121, a dielectric member 120 and an electrode 119. The capacitance C2 is connected to a diode 118 constituted by a P-semiconductor and an N-semiconductor. The diode 118 is connected to an electrode 118 of the liquid crystal element through a via electrode 127 formed in an insulating film 117. The liquid crystal element is constituted by a liquid crystal 114 which is positioned between electrodes 116, 112 respectively across liquid crystal orienting plates 113, 115. A polarizing plate 111 is provided across an insulating member 126. A via electrode 124 connected to the other electrode 124 of the antenna 6 is connected to the electrode 119 of the capacitance 120.

(Embodiment 4)

Figure 12:
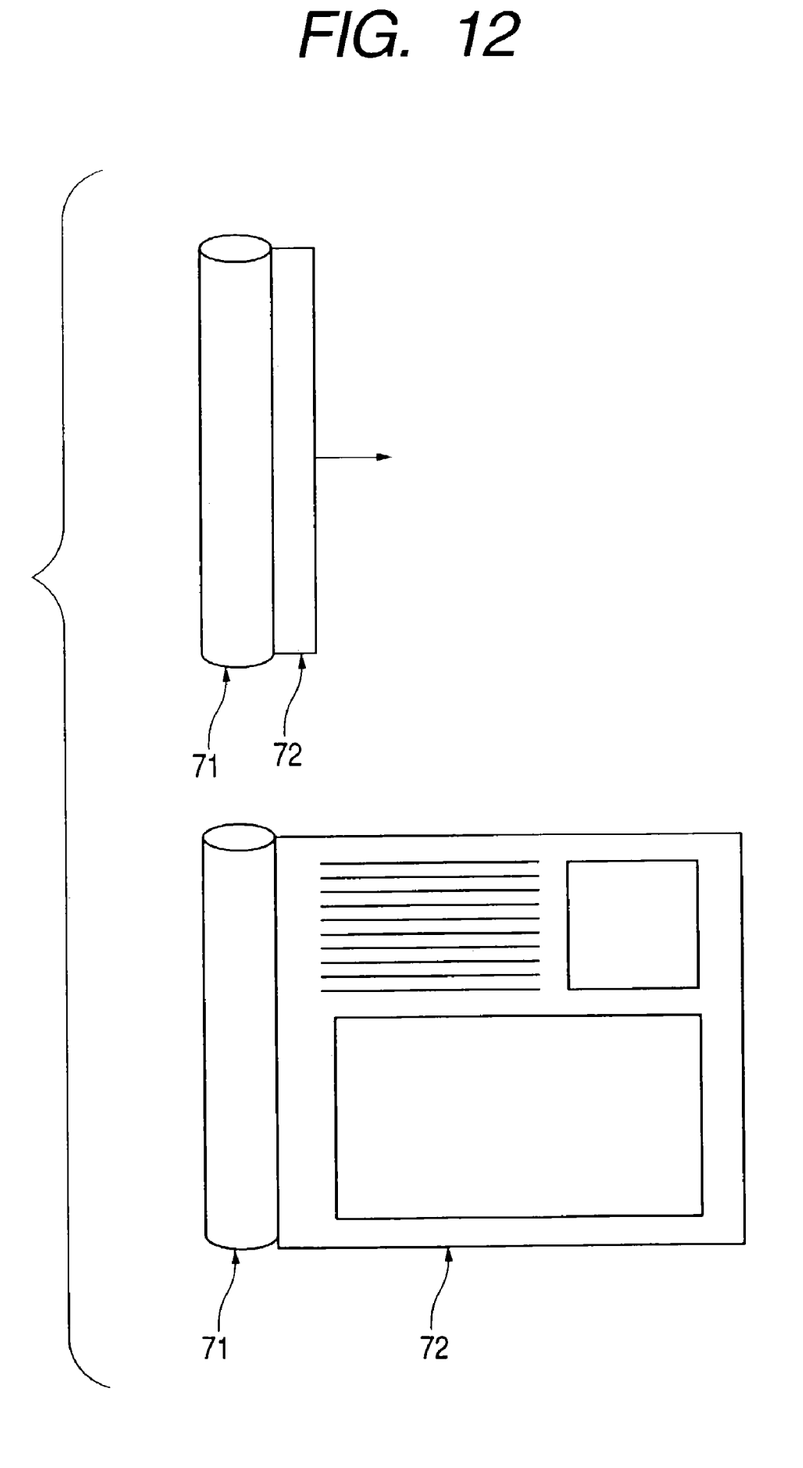
FIG. 12 is a view showing a paper-like display in which the image display apparatus of the present invention is applied.

FIG. 12 shows a paper-like display apparatus embodying an image display system of an embodiment 4. A tubular container unit 71 is provided for containing the image display unit and the wireless transmission unit.

In this electronic display, a display unit 72, formed by a flexible belt-like substrate, is normally wound extractably in a tubular container unit 71 as shown in FIG. 12 but is extended FIG. 12 only when the display is observed and is stored in the tubular container unit 71 for carrying, so that the electronic display can be handled like a newspaper or a magazine. In the tubular container unit 71, a wireless transmission unit 4 shown in the embodiment 1 is incorporated, while the display unit 72 is constituted by an image display unit 8. Such display requires a structure free from wirings and resistant to folding and extending, and is adapted as an application of the present invention.

In case of transferring a display content, the wireless transmission unit 4 may send an electromagnetic wave for causing a display on the display unit 72 in an extended state as shown in FIG. 12. In such case, however, since a distance from the wireless transmission unit to an end of the display unit becomes longer, it is also possible to provide plural tubular container units, for example, two tubular container units (711, 712) on both sides of the display unit 72 as shown in FIG. 13, and to provide the wireless transmission units respectively therein for achieving communication with closer image forming elements, thereby reducing the effective communication distance.

(Embodiment 5)

Figure 13:
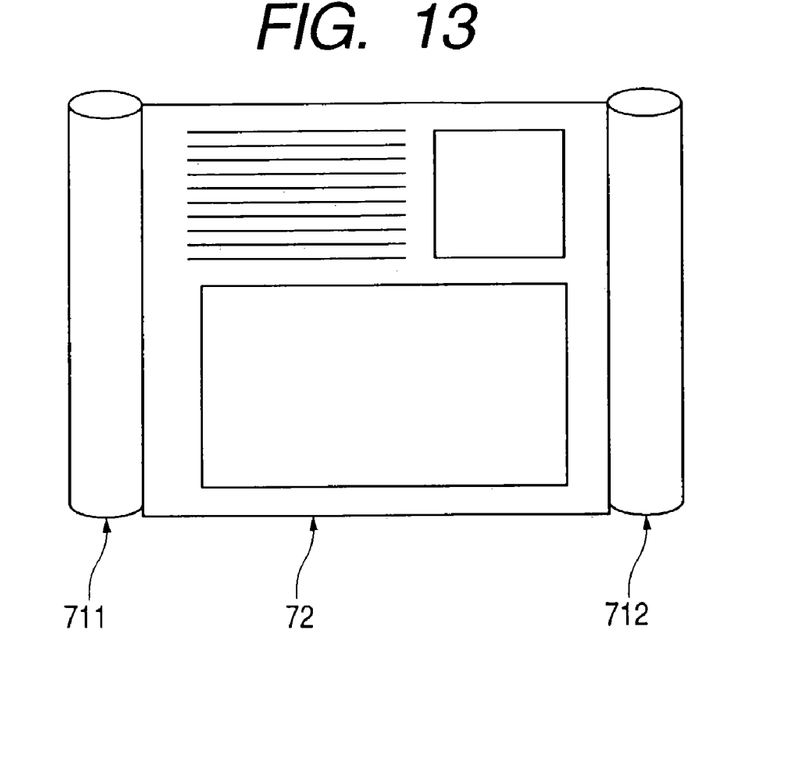
FIG. 13 is a view showing a paper-like display in which the image display apparatus of the present invention is applied.
Figure 14:
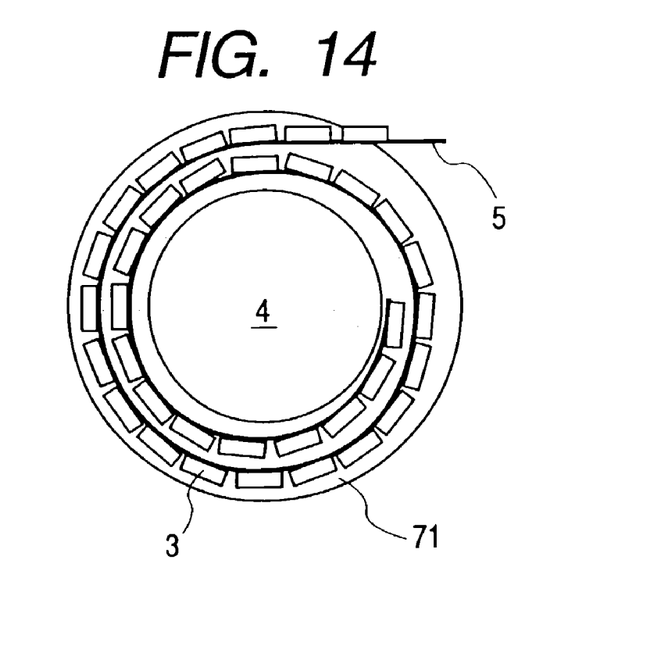
FIG. 14 is a cross-sectional view showing a tubular container unit including a wireless transmission unit of the paper-like display in which the image display apparatus of the present invention is applied.

FIG. 14 shows an example of a cross-sectional structure of the tubular container unit 71 shown FIG. 12 or FIG. 13.

The wireless image forming elements 3 formed in plural units on the substrate (base member) 5 are stored, in a wound state, in the tubular container unit 71. At the center, there is provided a rotatable cylinder which is used for winding the image display unit and in which the wireless transmission unit 4 is incorporated.

In the present embodiment, the instruction for image formation and/or the drive energy for the image forming element is transmitted from the wireless transmission unit 4 to the respective wireless image forming elements to execute an image formation in a state where the display unit is stored as shown in FIG. 14, and the substrate 5 is thereafter extended for image observation. Such communication in a folded or wound state reduces the distance of communication, thereby enabling the transmission with a lower power. It is also possible to perform the transmission in good state. Also such configuration of executing the wireless communication while the wireless image forming elements are stored in the container allows to suppress the leakage of the electromagnetic wave for wireless communication to the ambient space by the shield effect of the container. In such case, a conductive container is adequate in view of the electromagnetic shield effect. More specifically, there can be advantageously employed a container of a metal (or alloy) material, particularly aluminum or the like. For such container, there is particularly preferred a container having a shielding effect capable of attenuating an amplitude of the wireless signal, employed for the wireless communication, to a level of 50% or less in comparison with a case without such container. This embodiment employs a tubular container, but such configuration is not restrictive, and it is possible, for example, to employ a book-shaped container which is opened (a page-opened state) in a normal use state and is closed in case of a storage.

In addition, in the constitution as shown in FIG. 14, the distance of communication is reduced by deforming the image display unit, but there is not limited to only such a way, it is also possible to reduce the distance between the display unit and the transmission unit without deforming the image display unit. For example, it is possible that the book-shaped container is closed to reduce the distance between the display unit and the transmission unit in this container thereby to execute the transmission and reception.

Figure 15:
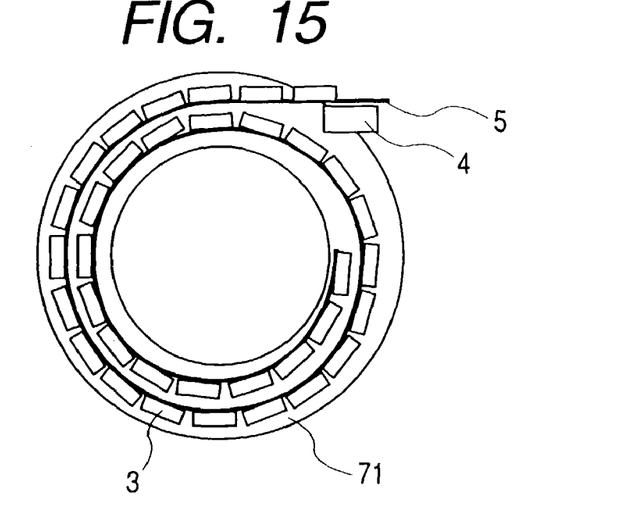
FIG. 15 is a cross-sectional view showing a tubular container unit including a wireless transmission unit of the paper-like display in which the image display apparatus of the present invention is applied.

It is also possible, as shown in FIG. 15, to provide the wireless transmission unit 4 at a position where the substrate 5 is extracted from the tubular container unit 71 and to execute the wireless communication in a stage where the substrate 5 is extended from or stored in the tubular container portion 71. In such case, the instruction for image formation and/or the drive energy for the image forming element is received while the wireless image forming elements and the wireless transmission unit are in a mutual displacement. This configuration further shortens the distance of communication, thereby achieving secure communication with a low power.

In the configurations shown in FIGS. 14 and 15, there is preferably employed an image forming element having a memory property, capable of retaining the image when the transmission or the energy for image formation is turned off after the image formation. An example of such image forming element is a ferroelectric liquid crystal element.

In addition, in FIG. 14 or FIG. 15, the constitution using the container capable of holding the display unit and the transmission unit is shown, but there is not limited to only such a constitution. It is possible to preferably adopt a constitution in which a holding subject such as a user holds an image display apparatus having a display unit, and the holding subject operates to cause the display unit to get close to a transmission unit placed at a predetermined location so that the transmission or reception is performed in a state with the display unit and the transmission unit are close to each other. Or, it is possible to preferably adopt a constitution in which the holding subject holds the transmission unit and the holding subject operates to cause the transmission unit to get close to the image display having the display unit placed at a predetermined location so that the transmission or reception is performed in a state with the display unit and the transmission unit being close to each other.

(Embodiment 6)

Figure 4:
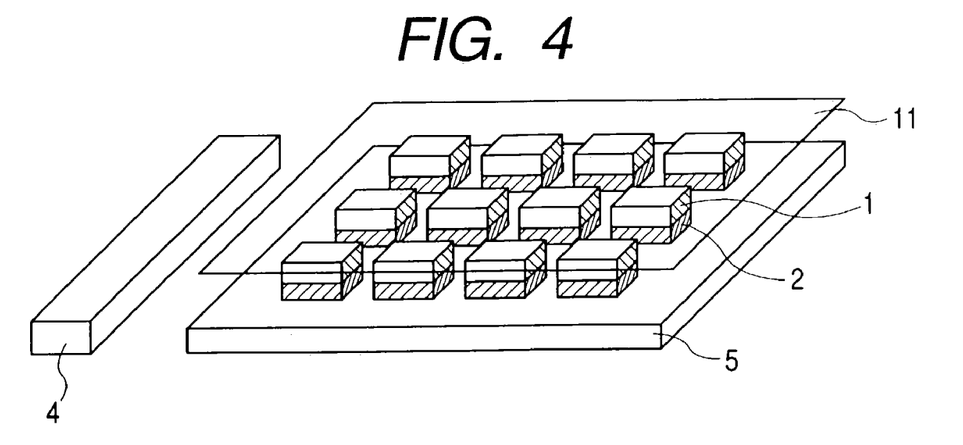
FIG. 4 is a view showing a configuration of the image display apparatus of the invention.
Figure 16:
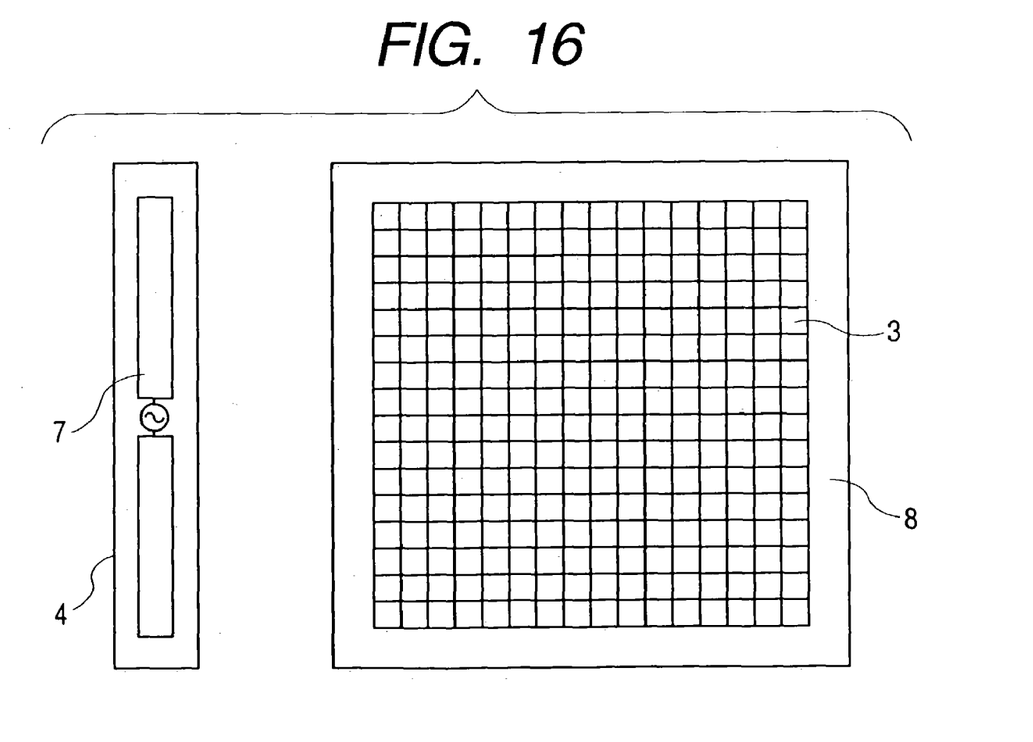
FIG. 16 is a view showing a configuration of an image forming apparatus of the present invention.
Figure 17:
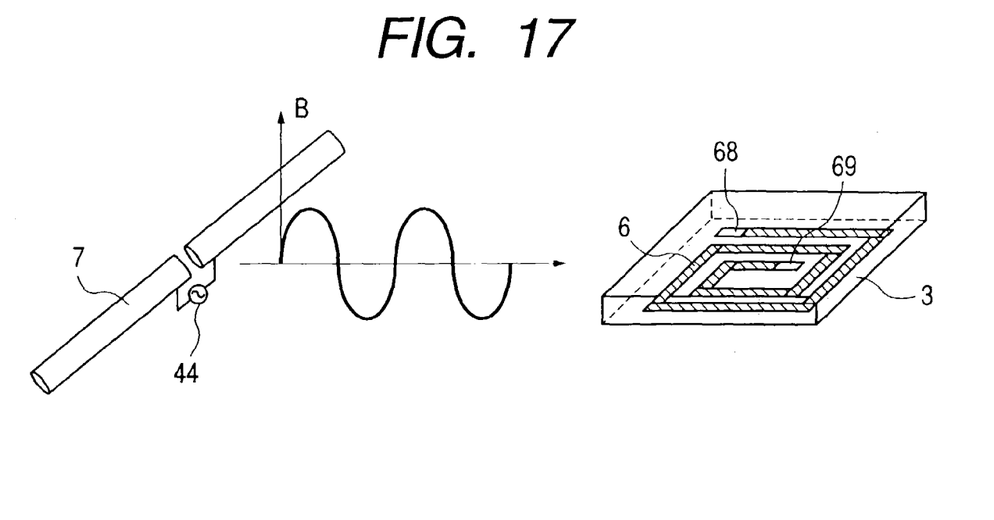
FIG. 17 is a view showing an example of the relationship among an antenna of a wireless transmission unit, a generated magnetic field and a wireless image forming element in the image forming apparatus of the present invention.

In case of executing a transmission in the configurations shown in FIG. 2, 4 or 5, or in a state where the image display unit is opened in the configuration shown in FIG. 12 or FIG. 13, there can be employed a method of communication shown in FIGS. 16 and 17. In this method, the wireless transmission unit 4 employs a dipole antenna 7 to which a high frequency 44 is applied as shown in FIG. 17 to supply a generated magnetic field B to the wireless image forming element 3. As the antenna 6 of the wireless image forming element is placed in a plane parallel to the dipole antenna 7, a change in the generated magnetic field B generates, in the antenna 6, an induced electric power which is taken out through terminals 68, 69 to execute an image formation in the image forming element, whereby an image can be formed on the entire image display unit 8. As an example, there are employed a high frequency 44 of 2.45 GHz and an antenna 4 of a length of 5 to 6 cm corresponding to a half of the wavelength.

In addition, various constitutions can be adopted to identify the wireless image forming elements giving the instruction for image formation, in short, to execute addressing. Concretely, as explained in the embodiment 3, there is a constitution wherein a transmission array (in which separated transmission units are arranged corresponding to respective ones of all wireless image forming elements) is used so that the transmission array comes close to the display units. In this constitution, it is possible to select the wireless image forming element giving a specific instruction for image formation by selecting (addressing) the transmission unit. And also, it is possible to adopt a constitution wherein a high directive electromagnetic wave is irradiated to ones of the wireless image forming elements, which are desired to be given with the instruction for image formation. In the former constitution, it is desired to enhance precision for alignment of the transmission array with the display unit, and in the latter constitution, it is desired to enhance precision in controlling a position with the electromagnetic wave being irradiated. On the other hand, as in the embodiment 2, if the constitution wherein the address information is transmitted so that the reception responsive to the address information or the processing of the address information, this constitution is particularly preferable because any requirement for precision is not needed. In the embodiment 2, the analog address information being the resonant frequency was used, but there is not limited to only such analog information and digital data may be used as the address information.

As explained in the foregoing, the inventions of the present application can realize an image display based on wireless communication.

What is claimed is:

1. A method for displaying an image in an image display apparatus which comprises:
   an image display unit comprising a plurality of wireless image forming elements, each having an image forming element and a wireless element for executing a reception of an instruction for image formation by a wireless communication and/or a reception of a drive energy for the image forming element by a wireless communication; and a wireless transmission unit for executing a transmission of the instruction for image formation and/or a transmission of the drive energy by a wireless communication, the method comprising the steps of:
   shortening a distance between the wireless element and the wireless transmission unit; and
   executing the reception in the state with the distance being shortened, wherein the step of shortening the distance is performed by deforming at least one portion of the image display apparatus.

2. The method for displaying the image according to claim 1, wherein the step of shortening the distance is performed by deforming the image display unit.

3. A method for displaying an image in an image display apparatus which comprises: an image display unit comprising a plurality of wireless image forming elements, each having an image forming element and a wireless element for executing a reception of an instruction for image formation by a wireless communication; and a wireless transmission unit for executing a transmission of the instruction for image formation by a wireless communication, the method comprising the steps of:
   shortening a distance between the wireless element and the wireless transmission unit; and
   executing the reception in the state with the distance being shortened,
   wherein the step of shortening a distance is performed by deforming at least one portion of the image display apparatus.

4. The method for displaying the image according to claim 3, wherein the step of shortening the distance is performed by deforming the image display unit.

5. A method for displaying an image in an image display apparatus which comprises: an image display unit comprising a plurality of wireless image forming elements, each having an image forming element and a wireless element for executing a reception of a drive energy for the image forming element by a wireless communication; and a wireless transmission unit for executing a transmission of the drive energy by a wireless communication, the method comprising the steps of:
   shortening a distance between the wireless element and the wireless transmission unit; and
   executing the reception in the state with the distance being shortened,
   wherein the step of shortening the distance is performed by deforming at least one portion of the image display apparatus.

6. The method for displaying the image according to claim 5, wherein the step of shortening the distance is performed by deforming the image display unit.

* * * * *